(12) United States Patent
Ueda et al.

(10) Patent No.: US 8,110,513 B2
(45) Date of Patent: Feb. 7, 2012

(54) GLASS COMPOSITION AND OPTICAL MEMBER AND OPTICAL INSTRUMENT USING THE SAME

(75) Inventors: Motoi Ueda, Naka-gun (JP); Takashi Ozawa, Zama (JP); Kiyoaki Shinohara, Kokubunji (JP)

(73) Assignee: Nikon Corporation, Tokyo (JP)

( * ) Notice: Subject to any disclaimer, the term of this patent is extended or adjusted under 35 U.S.C. 154(b) by 196 days.

(21) Appl. No.: 12/213,750

(22) Filed: Jun. 24, 2008

(65) Prior Publication Data

US 2009/0018006 A1   Jan. 15, 2009

Related U.S. Application Data

(60) Provisional application No. 60/929,599, filed on Jul. 5, 2007.

(30) Foreign Application Priority Data

Jun. 27, 2007  (JP) ................... 2007-169070

(51) Int. Cl.
  *C03C 3/14* (2006.01)
  *C03C 3/12* (2006.01)
  *C03C 3/15* (2006.01)
  *C03C 3/155* (2006.01)
(52) U.S. Cl. .............. 501/49; 501/41; 501/50; 501/51
(58) Field of Classification Search ............. 501/41, 501/45, 47, 49, 50, 51
  See application file for complete search history.

(56) References Cited

U.S. PATENT DOCUMENTS

| | | | | |
|---|---|---|---|---|
| 3,661,600 A | * | 5/1972 | Izumitani et al. ............. | 501/41 |
| 4,732,875 A | * | 3/1988 | Sagara .......................... | 501/42 |
| 5,245,492 A | * | 9/1993 | Mizuno et al. ............ | 360/125.01 |
| 7,514,381 B2 | * | 4/2009 | Matsumoto et al. ........... | 501/50 |
| 7,666,332 B2 | * | 2/2010 | Sasai et al. ................... | 264/2.7 |
| 2007/0105702 A1 | * | 5/2007 | Matsumoto et al. ........... | 501/50 |
| 2008/0099937 A1 | | 5/2008 | Sasai et al. | |
| 2008/0132399 A1 | * | 6/2008 | Aitken et al. ................. | 501/27 |

FOREIGN PATENT DOCUMENTS

| | | | |
|---|---|---|---|
| CN | 1968904 A | | 5/2007 |
| DE | 3125299 A | * | 5/1982 |
| EP | 0 430 206 A1 | | 6/1991 |
| JP | A-62-119138 | | 5/1987 |
| JP | A-62-128946 | | 6/1987 |
| JP | A-3-80127 | | 4/1991 |
| JP | A-05-073702 | | 3/1993 |
| JP | 2007096257 A | * | 4/2007 |
| WO | WO 2006001346 A1 | * | 1/2006 |
| WO | WO 2006/129618 A1 | | 12/2006 |

OTHER PUBLICATIONS

Derwent Abstract 1987-189194, English Abstract of JP 62-119138 A, May 30, 1987.*
Derwent Abstract 1991-144212, English Abstract of JP 03-03080127 A, Apr. 4, 1991.*
Derwent Abstract 1987/201852, English Abstract of JP 62-128946 A, Jun. 11, 1987.*
European Office Action issued Aug. 16, 2010 in EP 08 777 640.7.
Chinese Office Action in Chinese Application No. 200880008319.1 mailed May 6, 2011, with English-language translation.

* cited by examiner

*Primary Examiner* — Karl Group
*Assistant Examiner* — Elizabeth A Bolden
(74) *Attorney, Agent, or Firm* — Oliff & Berridge, PLC

(57) ABSTRACT

A glass composition comprising: (A) $TeO_2$ (50-95 mol %); (B) $B_2O_3$ (1-33 mol %); (C) ZnO (1-37 mol %); (D) $Bi_2O_3$ (1-18 mol %); (E) $P_2O_5$ (0-15 mol %); (F) $R_2O$ (0-13 mol %), where R represents at least one element selected from the group consisting of Li, Na, and K; (G) MO (0-13 mol %), where M represents at least one element selected from the group consisting of Mg, Ca, Sr, and Ba; (H) $TiO_2$ (0-13 mol %); (I) $Nb_2O_5$ (0-10 mol %); (J) $Ta_2O_5$ (0-13 mol %); (K) $L_2O_3$ (0-11 mol %), where L represents at least one element selected from the group consisting of yttrium and lanthanoids; and (L) the total amount of $P_2O_5$, $R_2O$, MO, $TiO_2$, $Nb_2O_5$, $Ta_2O_5$, and $L_2O_3$ described in (E) to (K), respectively, is 0-15 mol %.

10 Claims, 1 Drawing Sheet

US 8,110,513 B2

GLASS COMPOSITION AND OPTICAL MEMBER AND OPTICAL INSTRUMENT USING THE SAME

BACKGROUND OF THE INVENTION

1. Field of the Invention

The present invention relates to a glass composition and an optical member and an optical instrument using the glass composition.

2. Related Background Art

The demand for materials having a high refractive index has been increasing year after year in the field of optical instruments and the like. For example, a glass having a refractive index $n_d$ of nearly 2.0 for a light (d line) having a wavelength of 587.562 nm is becoming more commonly used in optical instruments, such as digital cameras. As such materials having a high refractive index, a glass composition containing tellurium oxide ($TeO_2$) and lead oxide (PbO) for improvement of the refractive index have been disclosed, for example.

For example, Japanese Unexamined Patent Application Publication No. Sho 62-128946 discloses a glass composition having the following composition in mol %: 10 to 85% $TeO_2$; 1 to 50% $PO_5$; 1 to 50% PbO; 0 to 30% $Li_2O$; 0 to 40% ZnO; a total amount of $Li_2O$ and ZnO in a range from 1 to 40%; 0 to 30% $Na_2O$; 0 to 30% $K_2O$; 0 to 25% $Rb_2O$; 0 to 20% $Cs_2O$; a total amount of $Na_2O$, $K_2O$, $Rb_2O$, and $Cs_2O$ in a range from 0 to 30%; 0 to 20% MgO; 0 to 20% CaO; 0 to 20% SrO; 0 to 35% BaO; a total amount of MgO, CaO, SrO, and BaO in a range from 0 to 35%; 0 to 5% $Ta_2O_5$; 0 to 20% $Nb_2O_5$; a total amount of $Ta_2O_5$ and $Nb_2O_5$ in a range from 0 to 20%; 0 to 15% $SiO_2$; 0 to 25% $GeO_2$; 0 to 30% $B_2O_3$; 0 to 10% $Al_2O_3$; 0 to 20% $Sb_2O_3$; 0 to 15% $In_2O_3$; 0 to 4% $La_2O_3$; 0 to 4% $Y_2O_3$; 0 to 4% $Gd_2O_3$; 0 to 4% $Yb_2O_3$; 0 to 4% $ZrO_2$; 0 to 10% $Bi_2O_3$; 0 to 20% $TiO_2$; and 0 to 7% $WO_3$.

Meanwhile, Japanese Examined Patent Application Publication No. Hei 5-73702 discloses a glass composition having the following composition in weight %: 5 to 80% $TeO_2$; 1 to 70% PbO; 1 to 40% $B_2O_3$; 1 to 60% $Bi_2O_3$; 1 to 20% $Al_2O_3$; 0 to 50% ZnO; 0 to 30% $WO_3$; 0 to 20% MgO; 0 to 20% CaO; 0 to 30% SrO; and 0 to 30% BaO.

SUMMARY OF THE INVENTION

However, conventional glass compositions containing tellurium oxide ($TeO_2$) and lead oxide (PbO) do not necessarily have a sufficiently high transmittance (coloring) for a light in the visible light region (approximately 400 nm to 700 nm); thus, they have hardly been in practical use as optical parts, such as a lens and a prism. In addition, containing lead oxide (PbO), these conventional glass compositions have not yet been sufficient in terms of environmental load.

The present invention has been accomplished in consideration of the problems involved in the above-described prior art. An object of the present invention is to provide a glass composition that has: sufficiently low environmental load by containing no lead oxide; a sufficiently high refractive index $n_d$ for a light (d line) having a wavelength of 587.562 nm; a sufficiently high transmittance for a light having a wavelength in the visible light region; and a sufficiently high level of melt stability, and also to provide an optical member and an optical instrument using the glass composition.

The present inventors have further studied in order to achieve the above object. As a result, the present inventors found that, by satisfying the conditions (A) to (L) listed below, it is possible to obtain a glass composition having: sufficiently low environmental load by containing no lead oxide; a sufficiently high refractive index $n_d$ for a light (d line) having a wavelength of 587.562 nm; a sufficiently high transmittance for a light having a wavelength in the visible light region; and a sufficiently high level of melt stability. Thus, the present inventors came to complete the present invention.

Specifically, the glass composition of the present invention is a glass composition satisfying the following conditions (A) to (L), the conditions are:

(A) A content ratio of $TeO_2$ is in a range from 50 to 95 mol %.

(B) A content ratio of $B_2O_3$ is in a range from 1 to 33 mol %.

(C) A content ratio of ZnO is in a range from 1 to 37 mol %.

(D) A content ratio of $Bi_2O_3$ is in a range from 1 to 18 mol %.

(E) A content ratio of $P_2O_5$ is in a range from 0 to 15 mol %.

(F) A content ratio of $R_2O$ (where R represents at least one element selected from the group consisting of Li, Na and K) is in a range from 0 to 13 mol %.

(G) A content ratio of MO (where M represents at least one element selected from the group consisting of Mg, Ca, Sr, and Ba) is in a range from 0 to 13 mol %.

(H) A content ratio of $TiO_2$ is in a range from 0 to 13 mol %.

(I) A content ratio of $Nb_2O_5$ is in a range from 0 to 10 mol %.

(J) A content ratio of $Ta_2O_5$ is in a range from 0 to 13 mol %.

(K) A content ratio of $L_2O_3$ (where L represents at least one element selected from the group consisting of yttrium and lanthanoids) is in a range from 0 to 11 mol %.

(L) A content ratio of a total amount of $P_2O_5$, $R_2O$, MO, $TiO_2$, $Nb_2O_5$, $Ta_2O_5$, and $L_2O_3$ described in (E) to (K), respectively, is in a range from 0 to 15 mol %.

In the glass composition of the present invention, the content ratio of $TeO_2$ is preferably in a range from 75 to 95 mol %.

In the glass composition of the present invention, the content ratio of $B_2O_3$ is preferably in a range from 3 to 15 mol %.

In the glass composition of the present invention, the content ratio of ZnO is preferably in a range from 3 to 15 mol %.

In the glass composition of the present invention, the content ratio of $Bi_2O_3$ is preferably in a range from 1 to 10 mol %.

An optical member of the present invention comprises the glass composition of the present invention. Furthermore, the optical instrument of the present invention comprises an optical member comprising the glass composition of the present invention.

According to the present invention, it is possible to provide a glass composition having: sufficiently low environmental load by containing no lead oxide; a sufficiently high refractive index $n_d$ for a light (d line) having a wavelength of 587.562 nm; a sufficiently high transmittance for a light having a wavelength in the visible light region; and a sufficiently high level of melt stability. It is also possible to provide an optical member and an optical instrument using the glass composition.

DETAILED DESCRIPTION OF THE PREFERRED EMBODIMENTS

Figure 1:
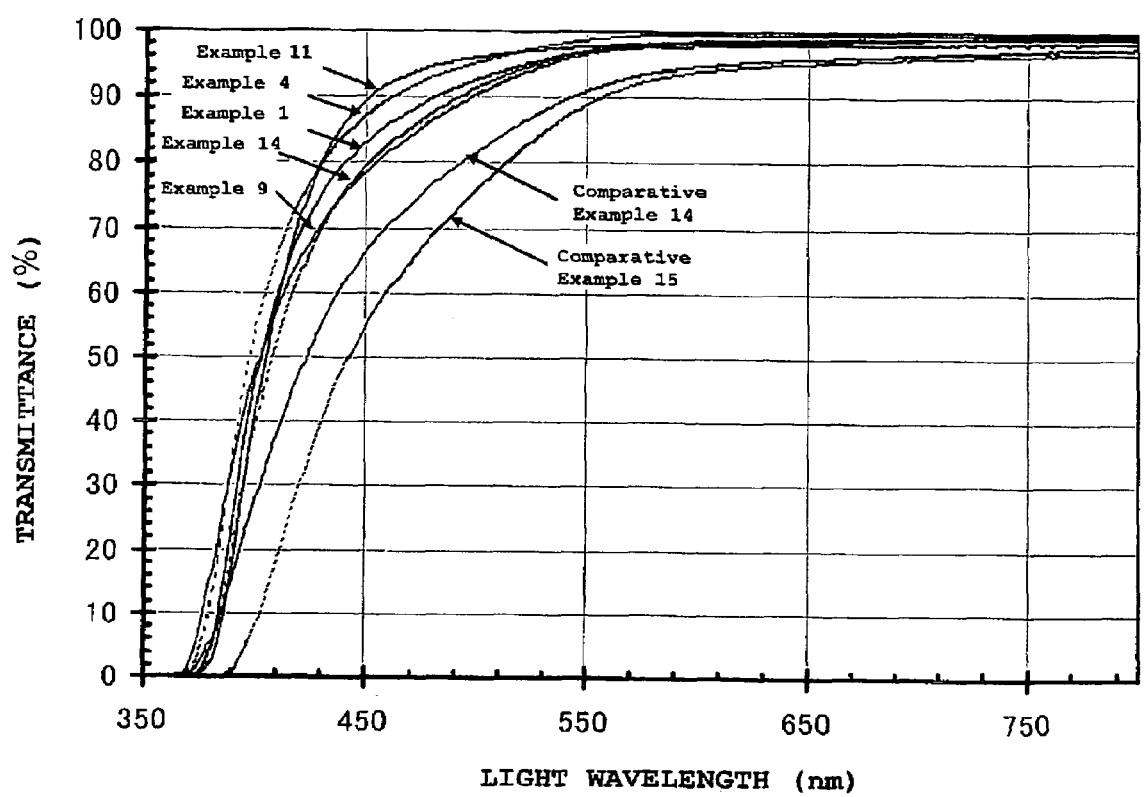
FIG. 1 is a graph showing transmittances for visible light of the glass compositions of the present invention (Examples 1, 4, 9, 11, and 14) and glass compositions for comparison (Comparative Examples 14 and 15).

The present invention will be described below in detail in view of the preferred embodiments.

Firstly, the glass composition of the present invention will be described. In the glass composition of the present invention, the above-described conditions (A) to (L) are satisfied. The glass composition of the present invention will be described below by referring to the individual conditions.

The glass composition of the present invention satisfies the condition that a content ratio of tellurium oxide ($TeO_2$) is in a range from 50 to 95 mol % (condition (A)). $TeO_2$ in such amount serves as a glass forming oxide in the composition system of the glass composition of the present invention. Furthermore, by adding $TeO_2$, it is possible to achieve a sufficiently high refractive index $n_d$ (preferably $n_d$ is 2.0 or higher) for a light (d line) having a wavelength of 587.562 nm in a resultant composition. If the content ratio of $TeO_2$ is less than 50 mol %, it is not possible to obtain a glass composition having a sufficiently high refractive index. On the other hand, if the content ratio of $TeO_2$ exceeds 95 mol %, the melt stability of a resultant composition is lowered; thus, it is difficult to obtain a high-quality glass. In addition, in order to further improve the refractive index $n_d$ (preferably to improve $n_d$ to 2.0 or higher) of the glass composition of the present invention, the content ratio of $TeO_2$ is preferably in a range from 75 to 95 mol %.

The glass composition of the present invention also satisfies the condition that a content ratio of boric oxide ($B_2O_3$) is in a range from 1 to 33 mol % (condition (B)). $B_2O_3$ serves as a glass forming oxide in the composition system of the glass composition of the present invention, and is a constituent which is added to the glass composition for the purpose of sufficiently improving the melt stability. Furthermore, by adding $B_2O_3$, it is possible to improve the transmittance of a resultant glass composition for visible light. If the content ratio of $B_2O_3$ is less than 1 mol %, the melt stability and transmittance of a resultant composition are not sufficiently high. On the other hand, if the content ratio of $B_2O_3$ exceeds 33 mol %, it is impossible to obtain a glass composition having a sufficient refractive index $n_d$ (preferably $n_d$ of 2.0 or higher) for a light (d line) having a wavelength of 587.562 nm. In addition, in the glass composition of the present invention, in order to further improve the refractive index $n_d$ (preferably to improve $n_d$ to 2.0 or higher) while maintaining high transmittance of the glass composition, the content ratio of $B_2O_3$ is preferably in a range from 3 to 15 mol %.

The glass composition of the present invention also satisfies the condition that a content ratio of zinc oxide (ZnO) is in a range from 1 to 37 mol % (condition (C)). ZnO can improve the melt stability and chemical durability of the glass composition of the present invention while maintaining high transmittance. If the content ratio of ZnO is less than 1 mol %, a sufficiently high level of melt stability and chemical durability of a glass composition cannot be achieved. On the other hand, if the content ratio above 37 mol %, it is difficult to maintain high transmittance. In addition, in the glass composition of the present invention, in order to achieve higher stability and maintain higher transmittance, the content ratio of ZnO is preferably in a range from 3 to 15 mol %.

The glass composition of the present invention also satisfies the condition that a content ratio of bismuth oxide ($Bi_2O_3$) is in a range from 1 to 18 mol % (condition (D)). $Bi_2O_3$ makes it possible to achieve a sufficiently high level of melt stability and chemical durability while maintaining a high refractive index. If the content ratio of $Bi_2O_3$ is less than 1 mol %, a sufficiently high level of melt stability and chemical durability of a glass composition cannot be achieved. On the other hand, if the content ratio of $Bi_2O_3$ exceeds 18 mol %, the transmittance is lowered, and the resultant glass is optically highly dispersive. In addition, in order to further improve the transmittance for visible light (preferably to improve the transmittance to 75% or above at a wavelength of 450 nm, as a representative value) in the glass composition of the present invention, the content ratio of $Bi_2O_3$ is preferably in a range from 1 to 10 mol %.

The glass composition of the present invention further satisfies the condition that a content ratio of phosphorus oxide ($P_2O_5$) is in a range from 0 to 15 mol % (condition (E)). $P_2O_5$ is an effective constituent for maintaining the refractive index and transmittance of the glass composition at a sufficiently high level. If the content ratio of $P_2O_5$ exceeds 15 mol %, the devitrification resistance of the glass composition is lowered. In addition, in the glass composition of the present invention in order to further improve the refractive index and transmittance for visible light (preferably to improve the transmittance to 75% or higher at a wavelength of 450 nm, as a representative value), the content ratio of $P_2O_5$ is preferably in a range from 0 to 10 mol %.

The glass composition of the present invention also satisfies the condition that a content ratio of a compound expressed by a formula $R_2O$ (where R represents at least one element selected from the group consisting of Li, Na, and K) is in a range from 0 to 13 mol % (condition (F)). Such a compound expressed by $R_2O$ is an effective constituent for improving the melt stability of a glass composition. In the formula, R represents at least one element selected from the group consisting of Li, Na, and K. If the content ratio of a total amount of compounds expressed by $R_2O$ exceeds 13 mol %, the refractive index is lowered, and it is impossible to obtain a glass composition having a sufficient level of stability. It should be noted that one kind of the compound expressed by $R_2O$ may be added by itself, or two or more compounds each expressed by $R_2O$ may be added in combination.

The glass composition of the present invention also satisfies the condition that a content ratio of a compound expressed by a formula MO (where M represents at least one element selected from the group consisting of Mg, Ca, Sr, and Ba) is in a range from 0 to 13 mol % (condition (G)). Such a compound expressed by MO is an effective constituent for improving the melt stability of a glass composition. In this formula, M represents at least one element selected from the group consisting of Mg, Ca, Sr, and Ba. If the content ratio of a total amount of compounds expressed by MO exceeds 13 mol %, the refractive index is lowered, and it is impossible to obtain a glass composition having a sufficient level of stability. It should be noted that one kind of compound expressed by MO may be added by itself, or two or more compounds each expressed by MO may be added in combination.

The glass composition of the present invention further satisfies the condition that a content ratio of titanium oxide ($TiO_2$) is in a range from 0 to 13 mol % (condition (H)). The glass composition of the present invention also satisfies the condition that a content ratio of niobium oxide ($Nb_2O_5$) is in a range from 0 to 10 mol % (condition (I)). Furthermore, the glass composition of the present invention satisfies the condition that a content ratio of tantalum oxide ($Ta_2O_5$) is in a range from 0 to 13 mol % (condition (J)). The glass composition of the present invention also satisfies the condition that a content ratio of a compound expressed by a formula $L_2O_3$ (where L represents at least one element selected from the group consisting of yttrium and lanthanoids) is in a range from 0 to 11 mol % (condition (K)). By using the compounds expressed by $TiO_2$, $Nb_2O_5$, $Ta_2O_5$, and $L_2O$ described above in the conditions (H) to (K), respectively, the dispersibility of components contained in a glass composition can be effectively controlled while maintaining sufficiently high refractive index. If content ratios of the compounds described in the conditions (H) to (K) exceed the respective upper limits, a resultant glass composition is colored, and, as a result, the transmittance for light is lowered. Note that, in the formula in the condition (K), L represents at least one element selected from the group consisting of yttrium and lanthanoids.

As described above, the glass composition of the present invention contains $TeO_2$, $B_2O_3$, ZnO, and $Bi_2O_3$ described in the conditions (A) to (D), respectively, as essential components, and $P_2O_5$, $R_2O$, MO, $TiO_2$, $Nb_2O_5$, $Ta_2O_5$, and $L_2O_3$ described in the conditions (E) to (K), respectively, as optional components. Furthermore, the glass composition of the present invention satisfies the condition that a content ratio of a total amount of the optional components ($P_2O_5$, $R_2O$, MO, $TiO_2$, $Nb_2O_5$, $Ta_2O_5$, and $L_2O_3$) is in a range from 0 to 15 mol % (condition (L)). If the content ratio of a total amount of the optional components exceeds the upper limit, the refractive index, the melt stability, or the transmittance is lowered; thus, a desired glass composition cannot be obtained. It should be noted that the glass composition of the present invention does not contain lead oxide (PbO). By containing no PbO, the glass composition of the present invention can achieve sufficiently low environmental load.

In addition, the refractive index $n_d$ of the glass composition of the present invention for a light (d line) having a wavelength of 587.562 nm is preferably 2.0 or higher (more preferably 2.1 or higher). The Abbe number of the glass composition of the present invention is preferably 17.0 or larger (more preferably 20.0 or larger) The refractive index may be measured by adopting the following method: a sample having a regular triangular prism shape with a bottom surface side of 40 mm and a height of 15 mm is prepared, and the refractive index of the sample is measured by a minimum deviation angle method using a spectrometer manufactured by Nikon Corporation. The Abbe number can be calculated from the value of the refractive index measured as described above.

Furthermore, the transmittance of the glass composition of the present invention for visible light having a wavelength of 450 nm is preferably 75% or higher. The transmittance for visible light may be measured by the following method: a sample having a size of 30 mm in length, 20 mm in width, and 7 mm in thickness and a sample having a size of 30 mm in length, 20 mm in width, and 2 mm in thickness are prepared, and the transmittance is measured by using these samples and a transmittance measuring instrument ("CARY500" manufactured by Varian, Inc.).

Next, a description will be given of a method for producing the glass composition of the present invention. A method for producing the glass composition of the present invention is not particularly limited as long as a glass composition satisfying the above conditions (A) to (L) can be produced by the method, and any publicly-known method can be adopted accordingly. For example, the following method may be adopted: ingredient components are placed together in a platinum crucible in a composition satisfying the above conditions (A) to (L); the mixture is heated at a temperature in an approximate range from 800 to 950° C. (more preferably from 820 to 880° C.) for 5 to 15 minutes so as to melt the mixture; the molten mixture thus obtained is stirred, clarified, and the like so as to obtain a glass melt where individual ingredients are uniformly dispersed; the glass melt is poured into a mold heated to approximately 300 to 400° C.; and then the glass melt in the mold is gradually cooled down to room temperature to obtain a glass composition.

In the preceding section, the glass composition of the present invention has been described. In the following section, an optical member and an optical instrument of the present invention will be described. The optical member of the present invention is comprised of the glass composition of the present invention described above. Since the optical member is comprised of the glass composition of the present invention, the optical member has not only a high refractive index but also a high level of melt stability and a high transmittance. Therefore, the optical member of the present invention can be preferably applied to any use which requires a material having a high refractive index and a high transmittance (for example, prism, lens in a digital camera, and the like). The optical instrument of the present invention is comprised of the optical member comprising the glass composition of the present invention. The configuration of an optical instrument is not particularly limited as long as the optical instrument is comprised of the optical member described above. Such optical instruments may include, for example, a digital camera and an optical microscope.

EXAMPLES

In the following section, the present invention will be described more concretely by referring to Examples and Comparative Examples. However, the present invention is not limited to the Examples described in the following section.

Examples 1 to 29

Glass compositions having respective compositions shown in Tables 1 to 3 were produced. To be more specific, firstly, compounds (ingredients) shown in Tables 1 to 3 were placed in a composition described in the individual Examples in Tables 1 to 3 in a platinum crucible. The compounds in the platinum crucible were melted by heating at a temperature condition of 800 to 950° C. for 10 minutes, to obtain a molten mixture. Thereafter, the molten mixture was stirred and clarified at the temperature condition described above to obtain a glass melt where individual compounds are uniformly dispersed. Thereafter, the glass melt was poured into a mold (40 mm in length, 40 mm in width, 20 mm in thickness) heated at 300 to 350° C. The glass melt in the mold was gradually cooled down to room temperature (25° C.) over 20 hours to obtain a glass composition of the present invention.

TABLE 1

| | Example 1 | Example 2 | Example 3 | Example 4 | Example 5 | Example 6 | Example 7 | Example 8 | Example 9 | Example 10 |
|---|---|---|---|---|---|---|---|---|---|---|
| $B_2O_3$ [unit: mol %] | 5.3 | 13.5 | 16.4 | 19.1 | 21.9 | 24.7 | 9.0 | 8.4 | 7.6 | 6.0 |
| ZnO [unit: mol %] | 8.0 | 7.3 | 7.0 | 6.8 | 6.6 | 6.3 | 3.0 | 9.1 | 18.2 | 35.3 |
| $TeO_2$ [unit: mol %] | 81.7 | 74.6 | 72.2 | 69.8 | 67.4 | 65.0 | 82.9 | 77.8 | 70.0 | 55.4 |
| $Bi_2O_3$ [unit: mol %] | 5.0 | 4.6 | 4.4 | 4.3 | 4.1 | 4.0 | 5.1 | 4.7 | 4.2 | 3.3 |

TABLE 1-continued

|  | Example 1 | Example 2 | Example 3 | Example 4 | Example 5 | Example 6 | Example 7 | Example 8 | Example 9 | Example 10 |
|---|---|---|---|---|---|---|---|---|---|---|
| $TiO_2$ [unit: mol %] | 0 | 0 | 0 | 0 | 0 | 0 | 0 | 0 | 0 | 0 |
| $Nb_2O_5$ [unit: mol %] | 0 | 0 | 0 | 0 | 0 | 0 | 0 | 0 | 0 | 0 |
| BaO [unit: mol %] | 0 | 0 | 0 | 0 | 0 | 0 | 0 | 0 | 0 | 0 |
| $La_2O_3$ [unit: mol %] | 0 | 0 | 0 | 0 | 0 | 0 | 0 | 0 | 0 | 0 |
| $Ta_2O_5$ [unit: mol %] | 0 | 0 | 0 | 0 | 0 | 0 | 0 | 0 | 0 | 0 |
| $P_2O_5$ [unit: mol %] | 0 | 0 | 0 | 0 | 0 | 0 | 0 | 0 | 0 | 0 |
| PbO [unit: mol %] | 0 | 0 | 0 | 0 | 0 | 0 | 0 | 0 | 0 | 0 |
| Refraction index $n_d$ | 2.1524 | 2.1154 | 2.0980 | 2.0844 | 2.0691 | 2.0518 | 2.1520 | 2.1318 | 2.1006 | 2.0353 |
| Abbe number $\nu_d$ | 17.6 | 18.4 | 18.7 | 19.0 | 19.3 | 19.6 | 17.6 | 18.0 | 18.7 | 20.5 |
| melt stability | Good | Good | Good | Good | Good | Good | Good | Good | Good | Good |
| Transmittance (%) | 83 | 85 | 86 | 87 | 88 | 90 | 85 | 83 | 79 | 80 |
| Judgment on transmittance | Good | Good | Good | Good | Good | Good | Good | Good | Good | Good |

TABLE 2

|  | Example 11 | Example 12 | Example 13 | Example 14 | Example 15 | Example 16 | Example 17 | Example 18 | Example 19 | Example 20 |
|---|---|---|---|---|---|---|---|---|---|---|
| $B_2O_3$ [unit: mol %] | 15.0 | 13.4 | 12.2 | 8.6 | 7.4 | 8.4 | 8.2 | 7.9 | 5.0 | 5.0 |
| ZnO [unit: mol %] | 18.0 | 12.0 | 10.9 | 7.7 | 6.7 | 7.6 | 7.4 | 7.1 | 8.0 | 8.0 |
| $TeO_2$ [unit: mol %] | 50.0 | 67.1 | 70.1 | 78.9 | 81.8 | 77.9 | 75.3 | 72.9 | 76.0 | 79.0 |
| $Bi_2O_3$ [unit: mol %] | 17.0 | 7.5 | 6.8 | 4.8 | 4.1 | 6.1 | 9.1 | 12.1 | 5.0 | 5.0 |
| $TiO_2$ [unit: mol %] | 0 | 0 | 0 | 0 | 0 | 0 | 0 | 0 | 0 | 3.0 |
| $Nb_2O_5$ [unit: mol %] | 0 | 0 | 0 | 0 | 0 | 0 | 0 | 0 | 6.0 | 0 |
| BaO [unit: mol %] | 0 | 0 | 0 | 0 | 0 | 0 | 0 | 0 | 0 | 0 |
| $La_2O_3$ [unit: mol %] | 0 | 0 | 0 | 0 | 0 | 0 | 0 | 0 | 0 | 0 |
| $Ta_2O_5$ [unit: mol %] | 0 | 0 | 0 | 0 | 0 | 0 | 0 | 0 | 0 | 0 |
| $P_2O_5$ [unit: mol %] | 0 | 0 | 0 | 0 | 0 | 0 | 0 | 0 | 0 | 0 |
| PbO [unit: mol %] | 0 | 0 | 0 | 0 | 0 | 0 | 0 | 0 | 0 | 0 |
| Refraction index $n_d$ | 2.0746 | 2.1130 | 2.1172 | 2.1398 | 2.1427 | 2.1436 | 2.1608 | 2.1776 | 2.1476 | 2.1434 |
| Abbe number $\nu_d$ | 18.7 | 18.2 | 18.1 | 17.9 | 17.8 | 17.7 | 17.2 | 16.8 | 17.5 | 17.5 |
| melt stability | Good | Good | Good | Good | Good | Good | Good | Good | Good | Good |
| Transmittance (%) | 90 | 88 | 83 | 80 | 79 | 82 | 84 | 87 | 79 | 79 |
| Judgment on transmittance | Good | Good | Good | Good | Good | Good | Good | Good | Good | Good |

TABLE 3

|  | Example 21 | Example 22 | Example 23 | Example 24 | Example 25 | Example 26 | Example 27 | Example 28 | Example 29 |
|---|---|---|---|---|---|---|---|---|---|
| $B_2O_3$ [unit: mol %] | 5.0 | 14.0 | 10.0 | 15.0 | 5.0 | 10.0 | 16.7 | 8.3 | 7.6 |
| ZnO [unit: mol %] | 8.0 | 8.0 | 8.0 | 8.0 | 8.0 | 8.0 | 6.9 | 7.4 | 6.8 |
| $TeO_2$ [unit: mol %] | 72.0 | 70.0 | 67.0 | 65.0 | 82.0 | 70.0 | 62.7 | 76.3 | 70.1 |

TABLE 3-continued

|  | Example 21 | Example 22 | Example 23 | Example 24 | Example 25 | Example 26 | Example 27 | Example 28 | Example 29 |
|---|---|---|---|---|---|---|---|---|---|
| $Bi_2O_3$ [unit: mol %] | 5.0 | 5.0 | 5.0 | 5.0 | 1.0 | 7.0 | 3.9 | 4.6 | 4.3 |
| $TiO_2$ [unit: mol %] | 10.0 | 0 | 0 | 0 | 0 | 0 | 0 | 0 | 0 |
| $Nb_2O_5$ [unit: mol %] | 0 | 0 | 0 | 0 | 0 | 0 | 0 | 0 | 0 |
| BaO [unit: mol %] | 0 | 3.0 | 10.0 | 0 | 0 | 0 | 0 | 0 | 0 |
| $La_2O_3$ [unit: mol %] | 0 | 0 | 0 | 0 | 4.0 | 5.0 | 9.8 | 0 | 0 |
| $Ta_2O_5$ [unit: mol %] | 0 | 0 | 0 | 7.0 | 0 | 0 | 0 | 0 | 0 |
| $P_2O_5$ [unit: mol %] | 0 | 0 | 0 | 0 | 0 | 0 | 0 | 3.4 | 11.2 |
| PbO [unit: mol %] | 0 | 0 | 0 | 0 | 0 | 0 | 0 | 0 | 0 |
| Refraction index $n_d$ | 2.1564 | 2.0537 | 2.0481 | 2.0553 | 2.0891 | 2.0785 | 2.0001 | 2.1063 | 2.0316 |
| Abbe number $\nu_d$ | 16.6 | 19.5 | 20.0 | 20.0 | 19.6 | 19.5 | 22.6 | 18.7 | 20.7 |
| melt stability | Good | Good | Good | Good | Good | Good | Good | Good | Good |
| Transmittance (%) | 76 | 83 | 84 | 80 | 85 | 84 | 83 | 79 | 77 |
| Judgment on transmittance | Good | Good | Good | Good | Good | Good | Good | Good | Good |

Comparative Examples 1 to 14

Glass compositions for comparison were produced using the compounds (ingredients) shown in Tables 4 to 5 in the same method as described in Example 1 except that the compounds were mixed in each of the compositions shown in Tables 4 to 5.

TABLE 4

|  | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 | Comparative Example 10 |
|---|---|---|---|---|---|---|---|---|---|---|
| $B_2O_3$ [unit: mol %] | 0.9 | 37.2 | 5.5 | 23.9 | 7.6 | 1.0 | 5.6 | 5.5 | 5.0 | 5.0 |
| ZnO [unit: mol %] | 8.3 | 5.3 | 40.3 | 21.5 | 6.9 | 1.0 | 0.5 | 8.2 | 8.0 | 8.0 |
| $TeO_2$ [unit: mol %] | 85.6 | 54.2 | 51.1 | 41.2 | 70.4 | 97.0 | 88.5 | 85.5 | 67.0 | 67.0 |
| $Bi_2O_3$ [unit: mol %] | 5.2 | 3.3 | 3.1 | 13.4 | 15.1 | 1.0 | 5.4 | 0.8 | 5.0 | 5.0 |
| $TiO_2$ [unit: mol %] | 0 | 0 | 0 | 0 | 0 | 0 | 0 | 0 | 0 | 15.0 |
| $Nb_2O_5$ [unit: mol %] | 0 | 0 | 0 | 0 | 0 | 0 | 0 | 0 | 15.0 | 0 |
| BaO [unit: mol %] | 0 | 0 | 0 | 0 | 0 | 0 | 0 | 0 | 0 | 0 |
| $La_2O_3$ [unit: mol %] | 0 | 0 | 0 | 0 | 0 | 0 | 0 | 0 | 0 | 0 |
| $Ta_2O_5$ [unit: mol %] | 0 | 0 | 0 | 0 | 0 | 0 | 0 | 0 | 0 | 0 |
| $P_2O_5$ [unit: mol %] | 0 | 0 | 0 | 0 | 0 | 0 | 0 | 0 | 0 | 0 |
| PbO [unit: mol %] | 0 | 0 | 0 | 0 | 0 | 0 | 0 | 0 | 0 | 0 |
| Refraction index $n_d$ | — | 1.9851 | — | — | — | — | — | — | — | — |
| Abbe number $\nu_d$ | — | 21.3 | — | — | — | — | — | — | — | — |
| melt stability | Poor | Good | Poor | Poor | Poor | Poor | Poor | Poor | Poor | Poor |
| Transmittance (%) | — | 89 | — | — | — | — | — | — | — | — |
| Judgment on transmittance | — | Good | — | — | — | — | — | — | — | — |

TABLE 5

| | Comparative Example 11 | Comparative Example 12 | Comparative Example 13 | Comparative Example 14 |
|---|---|---|---|---|
| $B_2O_3$ [unit: mol %] | 14.0 | 3.1 | 0.5 | 5.0 |
| ZnO [unit: mol %] | 6.0 | 3.2 | 5.0 | 8.0 |
| $TeO_2$ [unit: mol %] | 63.0 | 64.8 | 80.0 | 77.0 |
| $Bi_2O_3$ [unit: mol %] | 4.0 | 11.5 | 4.5 | 5.0 |
| $TiO_2$ [unit: mol %] | 0 | 0 | 0 | 0 |
| $Nb_2O_5$ [unit: mol %] | 0 | 0 | 0 | 0 |
| BaO [unit: mol %] | 0 | 0 | 0 | 0 |
| $La_2O_3$ [unit: mol %] | 13.0 | 0 | 0 | 0 |
| $Ta_2O_5$ [unit: mol %] | 0 | 0 | 0 | 0 |
| $P_2O_5$ [unit: mol %] | 0 | 17.4 | 10.0 | 0 |
| PbO [unit: mol %] | 0 | 0 | 0 | 5.0 |
| Refraction index $n_d$ | — | — | 2.1014 | 2.0517 |
| Abbe number $v_d$ | — | — | 18.8 | 18.8 |
| melt stability | Poor | Poor | Good | Good |
| Transmittance (%) | — | — | 66 | 55 |
| Judgment on transmittance | — | — | Poor | Poor |

[Property Evaluation of Glass Compositions Obtained in Examples and Comparative Examples]

(Measurement of Melt Stability)

The melt stability of the individual glass compositions obtained in Examples and Comparative Examples was evaluated by visually observing whether or not there is a residual part of the compounds (ingredients) left undissolved in the glass melt during the production, and whether or not there is a residual crystal phase in a glass composition after the cooling process. In the evaluation of melt stability, a glass composition was evaluated as "good" where no residual part left unmelted was observed in the glass melt and no residual crystal phase was observed in the glass composition. On the other hand, in the evaluation of melt stability, a glass composition was evaluated as "poor" where a residual part left unmelted was observed in the glass melt or a residual crystal phase was observed in the glass composition. The evaluation results are shown in Tables 1 to 5.

Measurement of Refractive Index and Abbe Number

The refractive index and Abbe number of the glass compositions obtained in Examples and Comparative Examples were measured. To be more specific, firstly, a sample having a regular triangular prism shape with a bottom surface side of 40 mm and a height of 15 mm was prepared with each of the glass compositions obtained in Examples and Comparative Examples. Next, the refractive index of the individual glass compositions was measured with the respective samples by a minimum deviation angle method using a spectrometer manufactured by Nikon Corporation. The Abbe number was calculated from the value of the refractive index thus measured. The results are shown in Tables 1 to 5. It should be noted that the refractive indexes shown in Tables 1 to 5 each represent a refractive index $n_d$ for a light (d line) having a wavelength of 587.562 nm.

(Measurement of Transmittance)

The transmittance for visible light of the glass compositions obtained in Examples and Comparative Examples was measured. To be more specific, firstly, a sample having a size of 30 mm in length, 20 mm in width, and 7 mm in thickness and a sample having a size of 30 mm in length, 20 mm in width, and 2 mm in thickness were prepared using each of the glass compositions obtained in Examples and Comparative Examples. Next, by using the samples thus prepared and a transmittance measuring instrument ("CARY500" manufactured by Varian, Inc.), the transmittance for visible light was measured. In the evaluation of transmittance, a transmittance for light having a wavelength in a range from 700 to 300 nm was measured. A glass composition exhibiting a transmittance of 75% or higher for light having a wavelength of 450 nm was evaluated as "good," while a glass composition having a transmittance below 75% was evaluated as "poor." The evaluation results of transmittance and the values of transmittance (%) of the individual glass compositions for a light having a wavelength of 450 nm are shown in Tables 1 to 5. The transmittance for visible light of the glass compositions obtained in Examples 1, 4, 9, 11, and 14 and Comparative Examples 14 and 15 are shown a graph in FIG. 1.

As apparent from the results shown in Tables 1 to 3, it has been confirmed that the glass compositions of the present invention (Examples 1 to 29) each have a sufficiently high level of melt stability. Furthermore, the glass compositions of the present invention (Examples 1 to 29) each have a refractive index $n_d$ of 2.0 or higher; thus, it has been confirmed that these glass compositions of the present invention each have a sufficiently high refractive index. It was also confirmed that the transmittance at a wavelength of 450 nm was 75% or higher in all the glass compositions of the present invention.

On the other hand, as apparent from the results shown in Tables 4 to 5, the glass compositions obtained in Comparative Examples 1, 7, and 8 did not have a sufficient level of melt stability. This is because these glass compositions each contained $B_2O_3$, ZnO, or $Bi_2O_3$ in an amount less than 1.0 mol %. As for the glass composition obtained in Comparative Example 2, an excessive amount of $B_2O_3$ was contained; thus, the refractive index $n_d$ was less than 2.0 although a sufficient level of melt stability was achieved. In the glass compositions obtained in Comparative Examples 3 and 5, an excessive amount of ZnO or $Bi_2O_3$ was contained; thus, a sufficient level of melt stability was not achieved. In the glass composition obtained in Comparative Example 4, the content ratio of $TeO_2$ was less than 50 mol %, and an excessive amount of $Bi_2O_3$ was contained; thus, a sufficient level of melt stability was not achieved. In the glass composition obtained in Comparative Example 6, a sufficient level of melt stability was not achieved due to an excessive content of $TeO_2$. In the glass compositions obtained in Comparative Examples 9 to 12, an excessive amount of respective optional components, including $P_2O_5$, $TiO_2$, $Nb_2O_5$, and $La_2O_3$ ($L_2O_3$), was contained; thus, a sufficient level of melt stability was not achieved. Furthermore, in the glass composition obtained in Comparative Example 13, although the content ratio of $B_2O_3$ was less than 1.0 mol %, a sufficient level of melt stability and a sufficiently high refractive index were achieved by containing 10 mol % $P_2O_5$, which is an optional component. However, in the glass composition obtained in Comparative Example 13, the content ratio of $B_2O_3$ was less than 1.0 mol %; thus, the transmittance was not sufficiently high. In the glass composition obtained in Comparative Example 14, a sufficiently high level of melt stability and a sufficiently high refractive index were observed. However, the glass composition obtained in Comparative Example 14 contained PbO. More-over the transmittance of the glass composition obtained in Comparative Example 14 was not sufficiently high.

Furthermore, as apparent from the result shown in FIG. 1, it has been confirmed that the transmittance of each of the glass compositions of the present invention (Examples 1, 4, 9, 11, and 14) for visible light was sufficiently higher than the glass compositions for comparison (Comparative Examples 14 and 15).

As described above, according to the present invention, it is possible to provide a glass composition having: sufficiently low environmental load by containing no lead oxide; a sufficiently high refractive-index $n_d$ for a light (d line) having a wavelength of 587.562 nm; a sufficiently high transmittance for a light having a wavelength in the visible light region; and a sufficiently high level of melt stability. It is also possible to provide an optical member and an optical instrument using the glass composition. Hence, because of the superior refractive index and transmittance, the glass composition of the present invention can be preferably used as an optical member and the like, such as lens in digital camera, which are required to have a high refractive index and a high transmittance.

What is claimed is:

1. A glass composition satisfying the following conditions (A) to (L), and which does not contain PbO, the conditions being:
    (A) a content ratio of $TeO_2$ is in a range from 55.4 to 95 mol %;
    (B) a content ratio of $B_2O_3$ is in a range from 1 to 33 mol %;
    (C) a content ratio of ZnO is in a range from 1 to 37 mol %;
    (D) a content ratio of $Bi_2O_3$ is in a range from 1 to 18 mol %;
    (E) a content ratio of $P_2O_5$ is 0 mol %;
    (F) a content ratio of $R_2O$ (where R represents at least one element selected from the group consisting of Li, Na, and K) is in a range from 0 to 13 mol %;
    (G) a content ratio of MO (where M represents at least one element selected from the group consisting of Mg, Ca, Sr, and Ba) is in a range from 0 to 13 mol %;
    (H) a content ratio of $TiO_2$ is in a range from 0 to 13 mol %;
    (I) a content ratio of $Nb_2O_5$ is in a range from 0 to 10 mol %;
    (J) a content ratio of $Ta_2O_5$ is in a range from 0 to 13 mol %;
    (K) a content ratio of $L_2O_3$ (where L represents at least one element selected from the group consisting of yttrium and lanthanoids) is in a range from 0 to 11 mol %; and
    (L) a content ratio of a total amount of $P_2O_5$, $R_2O$, MO, $TiO_2$, $Nb_2O_5$, $Ta_2O_5$, and $L_2O_3$ described in (E) to (K), respectively, is in a range from 0 to 15 mol %.

2. The glass composition according to claim 1, wherein the content ratio of $TeO_2$ is in a range from 75 to 95 mol %.

3. The glass composition according to claim 1, wherein the content ratio of $B_2O_3$ is in a range from 3 to 15 mol %.

4. The glass composition according to claim 1, wherein the content ratio of ZnO is in a range from 3 to 15 mol %.

5. The glass composition according to claim 1, wherein the content ratio of $Bi_2O_3$ is in a range from 1 to 10 mol %.

6. An optical member comprising the glass composition according to claim 1.

7. An optical instrument comprising an optical member comprising the glass composition according to claim 1.

8. The glass composition according to claim 1, wherein a refractive index $n_d$ for a light having a wavelength of 587.562 nm is 2.0 or higher.

9. The glass composition according to claim 1, wherein the content ratio of $B_2O_3$ is in a range from 12.2 to 33 mol %.

10. The glass composition according to claim 3, wherein the content ratio of $B_2O_3$ is in a range from 12.2 to 15 mol %.

* * * * *